(12) United States Patent
Magnussen

(10) Patent No.: US 8,078,241 B2
(45) Date of Patent: Dec. 13, 2011

(54) UNIVERSAL CONSOLE FOR PORTABLE TELEPHONES

(75) Inventor: Per Magnussen, Bergen (NO)

(73) Assignee: Modulprodukter AS, Bergen (NO)

( * ) Notice: Subject to any disclaimer, the term of this patent is extended or adjusted under 35 U.S.C. 154(b) by 719 days.

(21) Appl. No.: 12/086,261

(22) PCT Filed: Dec. 1, 2006

(86) PCT No.: PCT/NO2006/000447
§ 371 (c)(1), (2), (4) Date: Jun. 5, 2008

(87) PCT Pub. No.: WO2007/069903
PCT Pub. Date: Jun. 21, 2007

(65) Prior Publication Data
US 2009/0163252 A1 Jun. 25, 2009

(30) Foreign Application Priority Data
Dec. 9, 2005 (NO) .................................. 20055864

(51) Int. Cl.
*H04M 1/00* (2006.01)
(52) U.S. Cl. .................. 455/575.9; 455/569.2; 379/455
(58) Field of Classification Search ............... 455/569.1, 455/575.1, 569.2, 575.9, 573; 379/455
See application file for complete search history.

(56) References Cited

U.S. PATENT DOCUMENTS

| 5,305,381 | A * | 4/1994 | Wang et al. | 379/455 |
| 5,822,427 | A * | 10/1998 | Braitberg et al. | 379/454 |
| 6,377,825 | B1 * | 4/2002 | Kennedy et al. | 455/569.2 |
| 6,785,567 | B2 * | 8/2004 | Kato | 455/575.9 |
| 6,999,797 | B2 * | 2/2006 | Crawford et al. | 455/564 |
| 7,778,023 | B1 * | 8/2010 | Mohoney | 361/679.41 |
| 2004/0087335 | A1 | 5/2004 | Peiker | |
| 2004/0132343 | A1 | 7/2004 | Bisplinghoff | |
| 2006/0014571 | A1 * | 1/2006 | Gordeyev | 455/569.1 |

FOREIGN PATENT DOCUMENTS

JP 2001-77899 10/2001

OTHER PUBLICATIONS

International Search Report of Feb. 27, 2007 of PCT/NO2006/000447.
International Written Opinion dated Feb. 27, 2007 of PCT/NO2006/000447.

* cited by examiner

*Primary Examiner* — Christopher M Brandt
(74) *Attorney, Agent, or Firm* — Abelman, Frayne & Schwab

(57) ABSTRACT

A universal console for portable telephones with electrical connection points is disclosed, where the connecting part in the console is arranged to adapt to the design of the telephone connections.

12 Claims, 2 Drawing Sheets

UNIVERSAL CONSOLE FOR PORTABLE TELEPHONES

The present invention concerns a universal console for portable telephones with an electrical connection point, comprising a holder arranged to clamp on and center a portable telephone.

Drivers talking on the phone and thus being distracted cause a substantial number of accidents occurring on the road. When an emergency situation suddenly occurs, or just a small change in the traffic, it is often too late to react adequately.

There are several hands free systems for safer use of mobile telephones while driving. There are systems where the telephone sits in a container, and where the system further comprises a central unit, a microphone, speakers or a connection to the car stereo equipment and connections between the parts.

JP 2001-77899, US2004/0087335, and US 2004/0132343 disclose holders for mobile telephones, where it is known that these comprise connection points, devices for centring and holding the phones, charging devices and so forth. None of these earlier publications comprise a console able to recognize different types of telephones like the present invention.

A disadvantage of the known systems is that most of the holders and central units are only fitted for one type of telephone, and at least only one brand of telephone. When the user exchange phones, which happens on average about once a year, he must also exchange the car system. This is clearly an expensive solution, and thus there is a need for a system that makes it possible to exchange type and brand of mobile phone, without this leading to substantial costs for the hands free system in the car.

The present invention intends to fill this need. The invention is described by the characteristic features of the invention, that is, by that the universal console further comprises:
- means of scanning a product specific code on the portable telephone;
- a central computing unit with data regarding the available types of telephones such as the form of their electrical connection point, circuit diagrams, and so on;
- a connection box with variable contact points, comprising a grid with connecting pins oriented in a manner enabling them to be moved in our out of the contact box, where the connecting pins that are up correspond to the electrical contact points on the portable telephone;
- a movable unit oriented to move the contact box against the contact points of the portable telephone.

A preferred embodiment of the present invention will now be described with the help of the attached figures, where:

Figure 1:
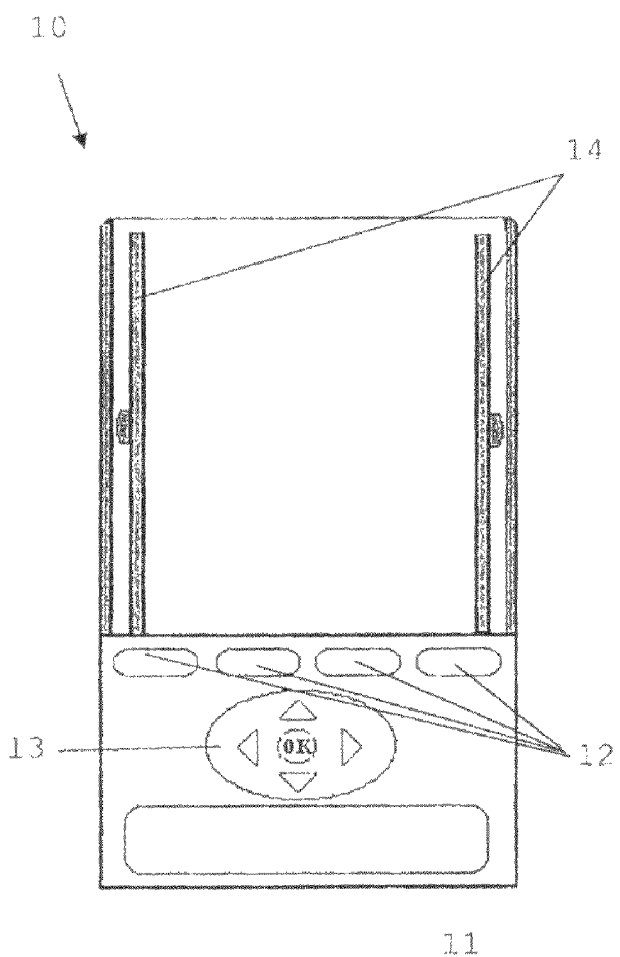
FIG. 1 shows a universal console without a mounted telephone.
Figure 2:
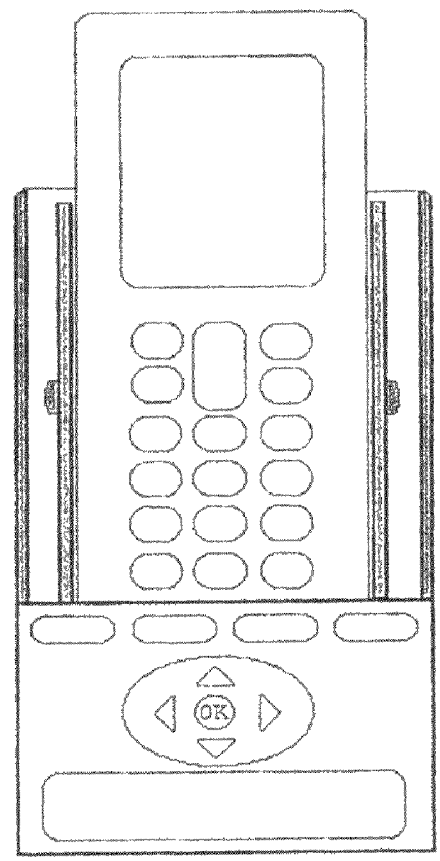
FIG. 2 shows a universal console with a mounted telephone.

The console 10 according to a preferred embodiment of the present invention can be provided with a display 11, operator control keys 12, and menu selection keys 13. These are meant to simplify the choice of different functions, such as confirmation of the telephone type, mute, volume, contrast, off, on, etc. Clamping edges 14 that center and clamp the telephone are positioned on the console.

Figure 3:
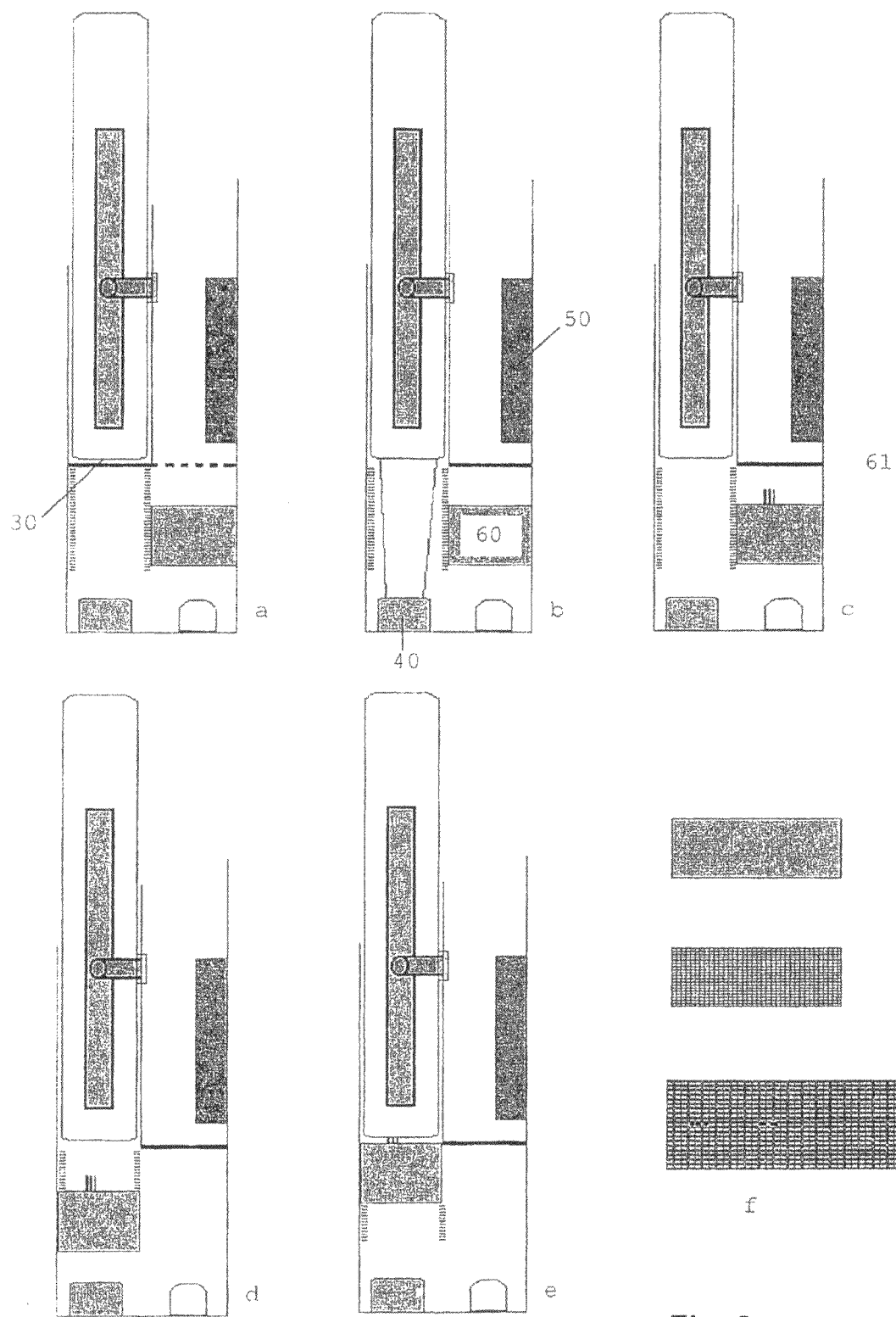
FIG. 3 shows different steps in the process of mounting and connecting a telephone.

When the telephone is installed in console 10, a contact box 20 is oriented in a passive position (FIG. 3a) not located immediately under the contact point 30 of the telephone. By the aid of a sensor 40 the lower side of the telephone is scanned (FIG. 3b). The lower side of the telephone should be fitted with a distinguishing mark that makes it possible to identify the type of telephone. The distinguishing mark may be a barcode, letters, numbers, three-dimensional shape of the contact, or other suitable characteristics. The scanned information is sent to the computing unit 50 comprising a database of telephone types and characteristics, and the telephone type is retrieved from the database. The sensor 40 passes on the information regarding the telephone to the computing unit (or computer controller) 50 According to this embodiment the brand and/or type of telephone is shown on display 11, so that the user can confirm if the system has correctly identified the type of telephone. This is done to prevent mistakes that may occur when the distinguishing mark is worn down, dirty, or damaged. The computing unit also contains data regarding the three-dimensional shape of the contact, and sends this data to a contact box 60. The contact box is constructed in a manner allowing it to confirm to the shape of the contact 30 belonging to the telephone type in question. This may be achieved by arranging a grid with connecting pins 61 in the contact box 60 (FIG. 3c), where the connecting pins 61 are arranged to be movable up and down by the aid of for example electromagnetic mini or micro spools. The connecting pins may be arranged in a square grid (FIG. 3f), or by other means. When the connecting pins 61 has been moved out of the contact box 60 in a pattern fitting the pattern of the contacts 30, the contact box 60 is moved under the contacts 30 (FIG. 3d), for example by an electrical motor or other suitable means. To position the contact box 60 exactly in the right place, the positional formation acquired by the sensor 40 is used. The computing unit 50 contains further information regarding how the contacts 30 are connected in the telephone, enabling the connecting pins 61 to be connected in confirmation with the specifications of the telephone.

There are telephone types where the contacts 30 are not even close to flat on the underside of the telephone, but rather the contact 30 is placed inside a hole in the downward side of the telephone. In such instances the connecting pins 61 will not be able to make connection with the contacts 30. Thus the contact box 60 may be provided as removable, so that the user may exchange the contact box with a different contact box belonging to the specific telephone type only. Alternatively an adapter may be provided, which is pushed into the console 10, between the contacts 30 of the telephone and the contact box 60.

According to a different embodiment of the present invention, which is not depicted in this application, the contact box may also be fitted with connection pins that lay flat on the contact box in one or more parallel rows of a number of connection pins, where the connecting pins may be flipped/turned upwards independent of each other to adapt to the contacts 30 of the telephone.

The system may advantageously be used in combination with other systems of functions in the car. One example is installing data with updated information regarding available telephone brands and types by way of the CD player of the car. Also, the information from the telephone may be displayed on a larger screen, which may be located separately or in connection with the console. In the future it is envisioned that telephones are fitted with an identification chip, and this would then also be used to identify the telephone, for example by means of a chip reader built in to the console.

The invention claimed is:
1. A universal console connectable to a vehicle's electrical system and operable with different specific portable telephones of which each has a set of electrical connection points in its own grid pattern and each has its own scannable prod- uct-specific code that identifies the specific grid pattern of electrical connection points associated with that particular telephone, comprising:

a. a holder adapted to receive and hold different ones of said telephones, b. an electronic scanner capable of reading the product-specific code on each of said different portable telephones when it is viewed by said scanner, c. a computer controller electrically coupled to said scanner and having a memory containing data of grid patterns of said different telephones corresponding to said product-specific codes thereon, d. an electrical contact box mounted to said holder, e. a plurality of electrical contacts in said contact box, with selected ones of said electrical contacts being positionable between, i. an active position where said electrical contacts form a grid pattern corresponding to the grid pattern of contact points of a telephone that is received in said holder and whose product-specific code has been scanned and identified by said scanner, and ii. an inactive position where said electrical contacts will not electrically couple with any connection points of said received telephone, and f. a drive unit controlled by said computer controller that selectively positions said electrical contacts in said contact box into a grid pattern that electrically matches the grid pattern of connection points of said received portable telephone for connection therewith when said portable telephone is inserted into said holder and for operating said portable telephone and console together.

2. The universal console according to claim 1 where said portable telephone received in holder both include microphone and speaker elements, and said central computer controller operates said microphone and speaker elements of said holder in place of said microphone and speaker elements in said portable telephone.

3. The universal console according to claim 1 where said received portable telephone has a battery that is chargeable through selected ones of said electrical contacts in said contact box.

4. The universal console according to claim 1 where said electrical contacts are positioned for contact with said portable telephone's connection points by moving said contact box until said electrical contacts engage said connection points.

5. The universal console according to claim 1, wherein said electrical contacts comprise connection pins are moved in or out of the contact box by means of electromagnetic spools that move said connection pins in their axial direction.

6. The universal console according to claim 5, wherein said connecting pins are arranged in parallel rows and are moved in or out of the contact box by turning the connection pins up from a flat position.

7. The universal console according to claim 1, wherein said computer controller is arranged to transfer audio data from at least one microphone and one speaker of said telephone to said at least one microphone and speaker respectively of said console.

8. The universal console according to claim 1, wherein said contact box is adapted to operate only with one of said specified portable telephones.

9. The universal console according to claim 1, wherein said console further comprises operating keys, a display, internal speakers and microphone, or other suitable operational means.

10. The universal console according to claim 1, wherein each of said portable telephones is equipped with a ID chip, and said console comprises a ID chip reader for identification of the portable telephone type.

11. The universal console according to claim 1, where the data regarding the available types of portable telephones includes the form of their electrical contact points and circuit diagrams.

12. The universal console according to claim 1, where said scanner is situated on said holder in a location where it can scan said product-specific code of a phone as the phone is inserted into said holder.

* * * * *